US010427302B2

(12) United States Patent
Takahashi et al.

(10) Patent No.: US 10,427,302 B2
(45) Date of Patent: Oct. 1, 2019

(54) ROBOT CONTROL APPARATUS CAPABLE OF TRANSFERRING WORKPIECE HAVING PARAMETER EXCEEDING RATED WORKPIECE PARAMETER

(71) Applicant: FANUC Corporation, Yamanashi (JP)

(72) Inventors: Hiromitsu Takahashi, Yamanashi (JP); Tsuyoshi Hannya, Yamamashi (JP)

(73) Assignee: FANUC CORPORATION, Yamanashi (JP)

( * ) Notice: Subject to any disclaimer, the term of this patent is extended or adjusted under 35 U.S.C. 154(b) by 265 days.

(21) Appl. No.: 14/797,926

(22) Filed: Jul. 13, 2015

(65) Prior Publication Data

US 2016/0011588 A1    Jan. 14, 2016

(30) Foreign Application Priority Data

Jul. 14, 2014    (JP) .................................. 2014-144365

(51) Int. Cl.
*B25J 9/16*    (2006.01)
(52) U.S. Cl.
CPC ... *B25J 9/1674* (2013.01); *G05B 2219/40454* (2013.01)
(58) Field of Classification Search
CPC ..................... B25J 9/1674; G05B 2219/40454
USPC .......................................... 700/112, 245–264
See application file for complete search history.

(56) References Cited

U.S. PATENT DOCUMENTS

| 4,726,732 A | 2/1988 | Kato |
| 4,988,934 A * | 1/1991 | Toyoda ................ G05B 19/416 318/568.15 |
| 6,246,923 B1 * | 6/2001 | Sugimura ............ G05B 19/416 414/217 |
| 7,489,982 B2 | 2/2009 | Liu et al. |
| 2002/0144968 A1 * | 10/2002 | Ruddy ..................... B66C 13/16 212/278 |
| 2003/0233171 A1 | 12/2003 | Heiligensetzer |
| 2007/0050115 A1 * | 3/2007 | Discenzo .............. B66C 13/063 701/50 |
| 2008/0071405 A1 * | 3/2008 | Liu .......................... G03F 7/26 700/108 |
| 2009/0133966 A1 * | 5/2009 | Shibata ................... B66B 1/308 187/293 |
| 2011/0076130 A1 * | 3/2011 | Stocker ................... B66C 13/46 414/815 |

(Continued)

FOREIGN PATENT DOCUMENTS

| CN | 101535169 A | 9/2009 |
| CN | 102120555 A | 7/2011 |

(Continued)

*Primary Examiner* — Kenneth M Lo
*Assistant Examiner* — Michael W Choi
(74) *Attorney, Agent, or Firm* — Hauptman Ham, LLP

(57) ABSTRACT

A robot control apparatus includes a setting unit which sets a workpiece parameter, which is a parameter of a workpiece itself and affects transferability of the workpiece transferred by the industrial robot, a storage unit which stores a rated workpiece parameter, which is a maximum parameter of the workpiece itself which can be transferred by the robot at a rated velocity, and a velocity limiting unit which reduces the maximum velocity of the industrial robot to a value lower than the rated velocity when the workpiece parameter set by the setting unit exceeds the rated workpiece parameter stored in the storage unit.

7 Claims, 3 Drawing Sheets

(56) References Cited

U.S. PATENT DOCUMENTS

| | | | |
|---|---|---|---|
| 2012/0245765 A1* | 9/2012 | Medwin | B66F 9/0755 701/2 |
| 2013/0064637 A1* | 3/2013 | Hosek | H01L 21/67288 414/800 |
| 2013/0074326 A1* | 3/2013 | Uekawa | H01L 21/677 29/739 |
| 2015/0329317 A1* | 11/2015 | Agirman | B66B 1/308 187/293 |
| 2017/0036894 A1* | 2/2017 | Braun | B66C 23/905 |

FOREIGN PATENT DOCUMENTS

| | | |
|---|---|---|
| CN | 201942453 U | 8/2011 |
| CN | 103025138 A | 4/2013 |
| CN | 103119327 A | 5/2013 |
| CN | 103176410 A | 6/2013 |
| DE | 19645812 C1 | 2/1998 |
| EP | 0333867 A1 | 9/1989 |
| EP | 0841743 B1 | 11/2003 |
| JP | 54-110558 A | 8/1979 |
| JP | 58-223583 A | 12/1983 |
| JP | 60-66485 U | 5/1985 |
| JP | 61-201305 A | 9/1986 |
| JP | 61-214983 A | 9/1986 |
| JP | 62-39152 A | 2/1987 |
| JP | 63-12006 A | 1/1988 |
| JP | 63-7917 A | 2/1988 |
| JP | 1-156804 A | 6/1989 |
| JP | 2-205490 A | 8/1990 |
| JP | 6-206190 A | 7/1994 |
| JP | 7-256577 A | 10/1995 |
| JP | 8-1566 A | 1/1996 |
| JP | 11-58287 A | 3/1999 |
| JP | 2009-28851 A | 2/2009 |
| JP | 2009-269733 A | 11/2009 |
| JP | 2013-144326 A | 7/2013 |
| WO | 93/22107 A1 | 11/1993 |

* cited by examiner

ROBOT CONTROL APPARATUS CAPABLE OF TRANSFERRING WORKPIECE HAVING PARAMETER EXCEEDING RATED WORKPIECE PARAMETER

RELATED APPLICATIONS

The present application claims priority to Japanese Application Number 2014-144365, filed Jul. 14, 2014, the disclosure of which is hereby incorporated by reference herein in its entirety.

BACKGROUND OF THE INVENTION

1. Field of the Invention

The present invention relates to a robot control apparatus capable of transferring a workpiece whose parameter exceeds a rated workpiece parameter.

2. Description of the Related Art

Upsizing of an industrial robot for transferring heavy-weight workpieces results in a considerable increase in cost for producing the robot. Some conventional apparatuses addressing this problem are known that achieve transfer of heavy objects by reducing the load acting on an industrial robot (for example, refer to Japanese Laid-open Patent Publication No. 61-214983, Japanese Laid-open Patent Publication No. 11-58287, or Japanese Examined Patent Application Publication No. 63-7917). The apparatuses described in these patent documents each include a balancer which is disposed on a ceiling above the industrial robot and is connected to a workpiece gripping unit of the robot so as to absorb the load acting on the robot in the direction of gravitational force.

However, the apparatuses described in the above patent documents result in cost increase due to the need for disposing a balancer on a ceiling.

SUMMARY OF THE INVENTION

A robot control apparatus according to an aspect of the present invention includes a setting unit which sets a workpiece parameter, which is a parameter of a workpiece itself and affects transferability of the workpiece transferred by the industrial robot, a storage unit which stores a rated workpiece parameter, which is a maximum parameter of the workpiece itself which can be transferred by the industrial robot at a rated velocity, and a velocity limiting unit which reduces the maximum velocity of the industrial robot to a value lower than the rated velocity when the workpiece parameter set by the setting unit exceeds the rated workpiece parameter stored in the storage unit.

BRIEF DESCRIPTION OF THE DRAWINGS

Objects, features, and advantages of the present invention will become more apparent from the following descriptions of an embodiment related to the accompanying drawings in which.

DETAILED DESCRIPTION

Figure 1:
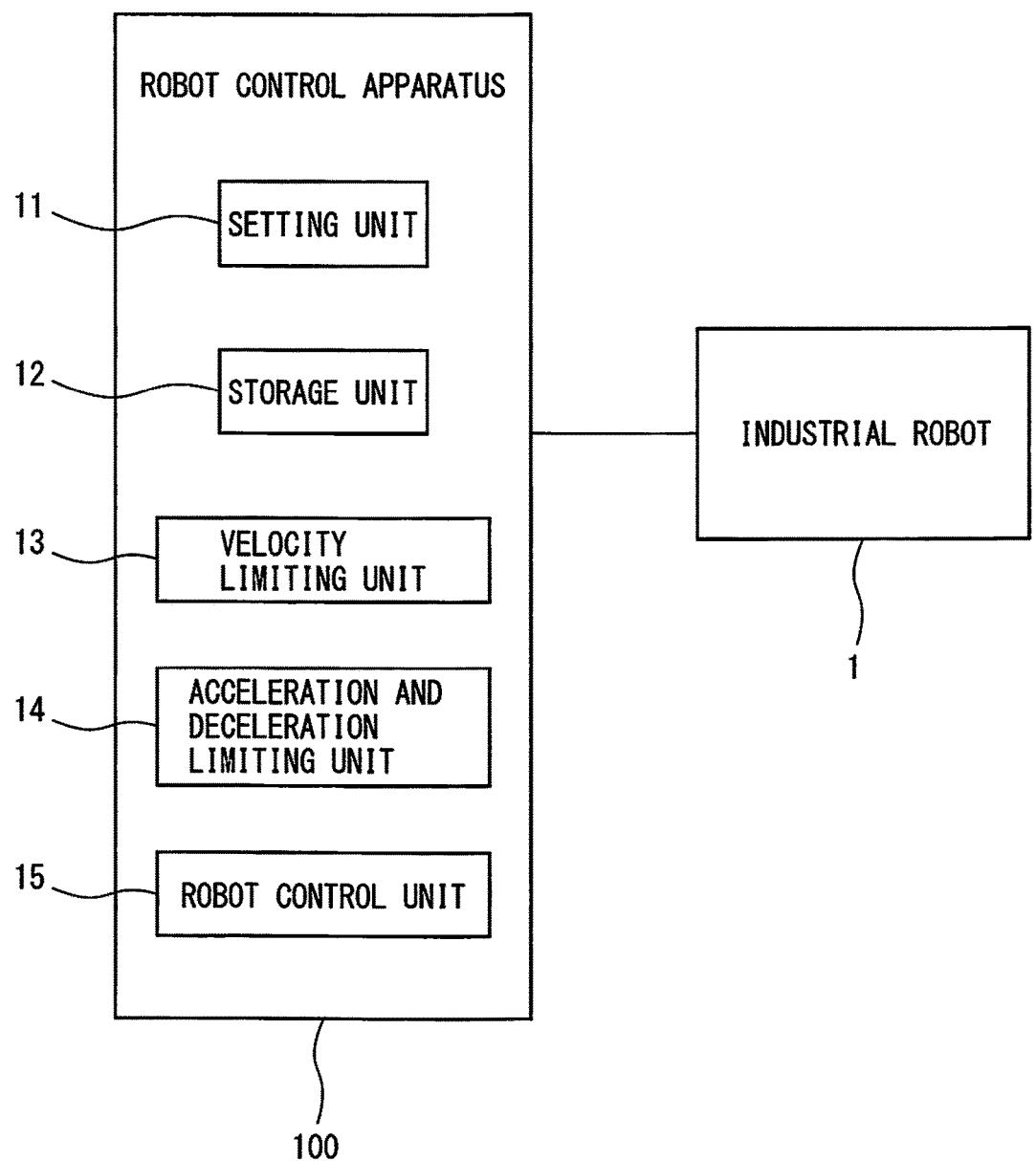
FIG. 1 is a block diagram illustrating major components of a robot control apparatus according to an embodiment of the present invention.

An embodiment of the present invention will now be described with reference to FIGS. 1 to 3. FIG. 1 is a block diagram illustrating major components of a robot control apparatus 100 according to the embodiment of the present invention. The robot control apparatus 100 is configured to control operations of a robot 1, which is an industrial robot. The robot 1 may be, for example, a multi-articular robot. The robot 1 has a gripping unit on the tip of the arm so that the gripping unit grips a workpiece and transfers it to a predetermined position.

For this kind of robot like the robot 1, the weight of a workpiece which can be transferred at a maximum velocity (hereinafter called a rated velocity Vmax) (the weight is hereinafter called a workpiece maximum weight Wmax) is predetermined as a specification for the robot. In other words, any workpiece heavier than the workpiece maximum weight Wmax makes it difficult for the robot to transfer the workpiece at a rated velocity. To handle this situation, a larger robot having greater transfer capability can be used to transfer a much heavier workpiece. However, using a larger robot involves a considerable increase in cost for producing the robot. Alternatively, a configuration may include a balancer or the like disposed on a ceiling above the robot to reduce the load acting on the robot. However, this configuration also involves cost rise due to the need for adding a balancer. In addition, this configuration imposes a limit on where to install the robot. Hence, the present embodiment is configured as follows in order to be able to transfer a workpiece heavier than a workpiece maximum weight Wmax while suppressing an increase in cost.

To begin with, the basic concept of the robot control apparatus 100 according to the embodiment of the present invention is described below. When a workpiece which has a mass of M and is gripped by the robot 1 moves at a velocity of V, the kinetic energy E of a workpeace is expressed as the following formula (I).

$$E = \tfrac{1}{2} M V^2 \qquad (\mathrm{I})$$

According to the formula (I) above, the kinetic energy E increases when the mass M of a workpiece is increased. An increase in the kinetic energy E caused by an increase in the mass M of a workpiece can be suppressed by reducing the velocity V of the workpiece. In other words, putting a limit on the maximum velocity of a workpiece enables the robot 1 to transfer a workpiece heavier than the workpiece maximum weight Wmax.

The robot control apparatus 100 in FIG. 1 is configured to include an arithmetic processing unit which has a CPU (a central processing unit), ROM (read only memory), RAM (random access memory), other peripheral circuits, and the like. The robot control apparatus 100 includes, as functional components, a setting unit 11, a storage unit 12, a velocity limiting unit 13, an acceleration and deceleration limiting unit 14, and a robot control unit 15.

The setting unit 11 sets a parameter determined by the workpiece itself to be transferred by the robot 1, i.e., a workpiece parameter WP. The workpiece parameter WP is a parameter related to a workpiece. The workpiece parameter WP includes physical quantities affecting transferability of a workpiece, such as the mass m, the inertia I, the position of the center of gravity, the moment of the workpiece, and the like. The workpiece parameter WP is inputted by a user through, for example, an input unit (not illustrated) connected to the robot control apparatus 100. Alternatively, a workpiece parameter WP calculated by the setting unit 11 with data, such as materials and shape of the workpiece, may be set.

The storage unit 12 stores in advance a rated workpiece parameter WP1, an upper-limit workpiece parameter WP2, a rated velocity Vmax, an upper-limit acceleration Amax, and an upper-limit deceleration Dmax. The rated workpiece parameter WP1, the upper-limit workpiece parameter WP2, and the rated velocity Vmax as stored in advance are values which are specific to the robot 1 and determined according to the configuration of the robot 1. The upper-limit acceleration Amax and the upper-limit deceleration Dmax are values assuring that the actuator torque is not saturated and that the tip of the hand does not vibrate when a workpiece with the upper-limit workpiece parameter WP2 is being transferred. The upper-limit acceleration Amax and the upper-limit deceleration Dmax can be determined by causing the robot 1 to transfer a workpiece having the upper-limit workpiece parameter WP2 in advance and by adjusting parameters. In addition, the upper-limit acceleration Amax and the upper-limit deceleration Dmax are stored in the storage unit 12 in advance. The rated workpiece parameter WP1, which is a maximum value of the workpiece parameter WP for a workpiece which can be transferred at a rated velocity Vmax, is given as a specification for the robot 1. In other words, in so far as the workpiece parameter WP is equal to or less than the rated workpiece parameter WP1, a workpiece can be transferred at a rated velocity Vmax.

The upper-limit workpiece parameter WP2, which is an upper limit of the workpiece parameter WP for a workpiece which can be transferred by the robot 1, is greater than the rated workpiece parameter WP1. The upper-limit workpiece parameter WP2 is determined by taking into consideration structural limits, such as strengths of the individual mechanisms in the robot 1 and torque performance limits of the actuator (servomotor or the like). Even when the workpiece parameter WP exceeds the rated workpiece parameter WP1, the robot 1 is still operable by reducing the velocity V to a value less than the rated velocity Vmax in so far as the workpiece parameter WP is less than the upper-limit workpiece parameter WP2.

The storage unit 12 stores respective physical quantities which constitute the rated workpiece parameter WP1 and the upper-limit workpiece parameter WP2. In other words, the mass m1, the inertia I1, and the like for the rated workpiece parameter WP1, as well as the mass m2, the inertia I2, and the like for the upper-limit workpiece parameter WP2 are stored respectively. When stored, a relationship of m2>m1 exists between the mass m1 and the mass m2 of a workpiece, and I2>I1 between the inertia I1 and the inertia I2.

The velocity limiting unit 13 sets a maximum velocity Vx for the robot 1 transferring a workpiece, depending on whether the workpiece parameter WP set by the setting unit 11 is greater or smaller than the rated workpiece parameter WP1 and the upper-limit workpiece parameter WP2 stored in the storage unit 12. For example, when the workpiece parameter WP is equal to or less than the rated workpiece parameter WP1 (hereinafter called a first range), the velocity limiting unit 13 sets the maximum velocity Vx to a value equal to the rated velocity Vmax. When the workpiece parameter WP is greater than the rated workpiece parameter WP1 and is equal to or less than the upper-limit workpiece parameter WP2 (hereinafter called a second range), the velocity limiting unit 13 sets the maximum velocity Vx to a value smaller than the rated velocity Vmax. When the workpiece parameter WP is greater than the upper-limit workpiece parameter WP2 (hereinafter called a third range), the velocity limiting unit 13 sets the maximum velocity Vx to 0.

The acceleration and deceleration limiting unit 14 sets an acceleration A and a deceleration D for the robot 1 transferring a workpiece, depending on whether the workpiece parameter WP set by the setting unit 11 is greater or smaller than the rated workpiece parameter WP1 and the upper-limit workpiece parameter WP2 stored in the storage unit 12. For example, when the workpiece parameter WP falls within the first range, the acceleration and deceleration limiting unit 14 imposes no limit. When the workpiece parameter WP falls within the second range, the acceleration and deceleration limiting unit 14 sets the acceleration A and the deceleration D to values smaller than the acceleration and deceleration which would occur in the first range. When the workpiece parameter WP falls within the third range, the acceleration and deceleration limiting unit 14 sets the acceleration A and the deceleration D to values equal to the upper-limit acceleration Amax and the upper-limit deceleration Dmax stored in the storage unit 12.

If the workpiece parameter WP is defined with the mass m of a workpiece, a range satisfying m≤m1 is the first range, a range satisfying m1<m≤m2 is the second range, and a range satisfying m>m2 is the third range. In this case, m1 corresponds to the maximum weight of a workpiece Wmax. If the workpiece parameter WP is defined with the inertia I of a workpiece, a range satisfying I≤I1 is the first range, a range satisfying I1<I≤I2 is the second range, and a range satisfying I>I2 is the third range.

If the workpiece parameter WP is defined with the mass m of a workpiece and falls within the second range, the velocity limiting unit 13 calculates a maximum velocity Vx in accordance with the following formula (II) using the mass m set by the setting unit 11.

$$Vx=(m1/m)^{1/2} \times Vmax \tag{II}$$

If the workpiece parameter WP is defined with the inertia I of a workpiece and falls within the second range, the velocity limiting unit 13 calculates a maximum velocity Vx in accordance with the following formula (III) using the inertia I set by the setting unit 11.

$$Vx=(I1/I)^{1/2} \times Vmax \tag{III}$$

If the workpiece parameter WP is defined with the mass m and inertia I and falls within the second range, the velocity limiting unit 13 calculates a maximum velocity according to the formula (II) above (hereinafter called a first maximum velocity Vx1) as well as calculates a maximum velocity according to the formula (III) above (hereinafter called a second maximum velocity Vx2). Furthermore, the velocity limiting unit 13 sets the maximum velocity Vx to a value equal to the first or second maximum velocity Vx1 or Vx2, whichever is smaller. The maximum velocity Vx as set above is smaller than the rated velocity Vmax.

The robot control unit 15 outputs control signals to the actuator (servomotor) for driving the robot in accordance with a predetermined operation program to control operations of the robot 1. For this purpose, the servomotor is controlled so that the moving velocity of the gripping unit does not exceed the maximum velocity Vx as set by the velocity limiting unit 13. For example, if the workpiece parameter WP falls within the second range and the instructed velocity predetermined in the operation program is the rated velocity Vmax, the robot control unit 15 changes the operation velocity so that the instructed velocity changes to a maximum velocity Vx, which is smaller than the rated velocity Vmax (refer to FIG. 3).

Figure 2:
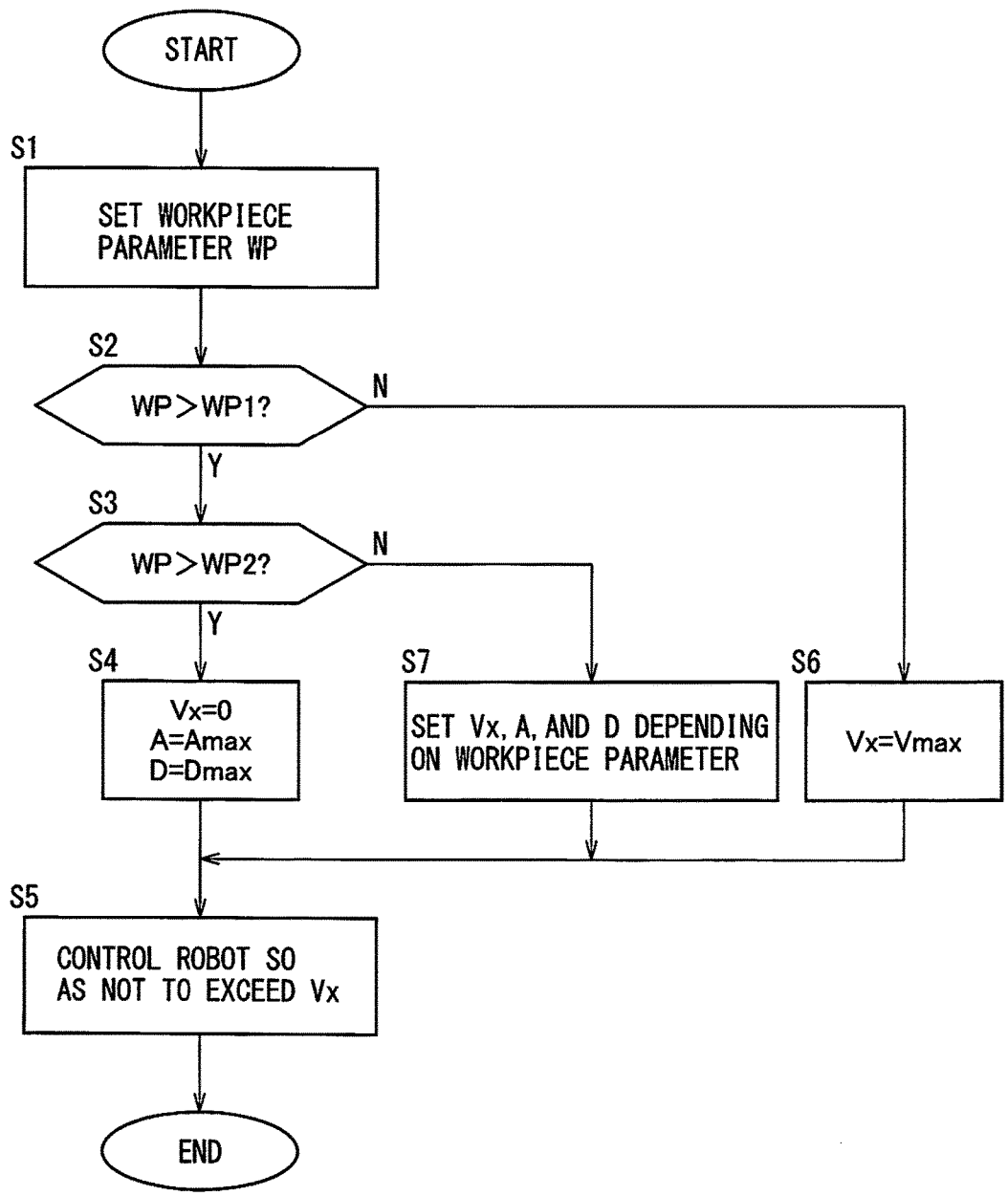
FIG. 2 is a flowchart illustrating example of operations performed by a robot control apparatus according to an embodiment of the present invention.

FIG. 2 is a flowchart illustrating example of processing performed by the robot control apparatus 100. The processing illustrated in the flowchart is triggered by, for example, a command to start a transfer operation performed by the robot 1. In Step S1, the setting unit 11 performs processing to set a parameter of the workpiece to be gripped by the gripping unit of the robot 1, i.e., the workpiece parameter WP which includes the mass m, inertial I, and the like of the workpiece.

In Step S2, the velocity limiting unit 13 performs processing to determine whether the workpiece parameter WP which has been set in Step S1 is greater than the rated workpiece parameter WP1 which is already stored in the storage unit 12. If Yes in Step S2, the control proceeds to Step S3, if No in Step S2, the control proceed to Step S6. In Step S6, because the workpiece parameter WP falls within the first range, the velocity limiting unit 13 performs processing to set the maximum velocity Vx to a value equal to the rated velocity Vmax. Furthermore, the acceleration and deceleration limiting unit 14 imposes no limit on the acceleration A and the deceleration D.

In Step S3, the velocity limiting unit 13 performs processing to determine whether the workpiece parameter WP which has been set in Step S1 is greater than the upper-limit workpiece parameter WP2 which is already stored in the storage unit 12. If Yes in Step S3, the control proceeds to Step S4, if No in Step S3, the control proceed to Step S7. In Step S7, because the workpiece parameter WP falls within the second range, the velocity limiting unit 13 performs processing to make the setting of a maximum velocity Vx using the formulas (II) and (III) above. The acceleration and deceleration limiting unit 14 sets the acceleration A and the deceleration D to values smaller than the acceleration and deceleration which would occur in the first range. On the other hand, in Step S4, because the workpiece parameter WP falls within the third range, the velocity limiting unit 13 performs processing to set the maximum velocity Vx to 0. The acceleration and deceleration limiting unit 14 sets the acceleration A and the deceleration D to values equal to the upper-limit acceleration Amax and the upper-limit deceleration Dmax, respectively, as stored in the storage unit 12.

In Step S5, the robot control unit 15 outputs control signals to the servomotor to control operations of the robot 1 so that the velocity does not exceed the specified maximum velocity Vx. In other words, when the workpiece parameter WP is greater than the upper-limit workpiece parameter WP2, which means Vx=0, the robot control unit 15 outputs a stop signal to the servomotor to stop operations of the robot 1. When the workpiece parameter WP is equal to or less than the rated workpiece parameter WP1, the robot control unit 15 outputs a control signal to the servomotor so that the maximum velocity Vx of the robot 1 (the gripping unit) is equal to the rated velocity Vmax. When the workpiece parameter WP is greater than the rated workpiece parameter WP1 and is equal to or less than the upper-limit workpiece parameter WP2, the robot control unit 15 outputs a control signal to the servomotor so that the maximum velocity Vx is reduced to a value lower than the rated velocity Vmax.

The following describes general operations of the robot control apparatus 100 according to the present embodiment. The description below assumes, for convenience, that the workpiece parameter WP is defined with the mass m of a workpiece and that the operation program already contains an instruction to move the gripping unit of the robot at the rated velocity Vmax. FIG. 3 is a diagram illustrating example of operating characteristics of the robot control apparatus 100 according to the present embodiment.

Figure 3:
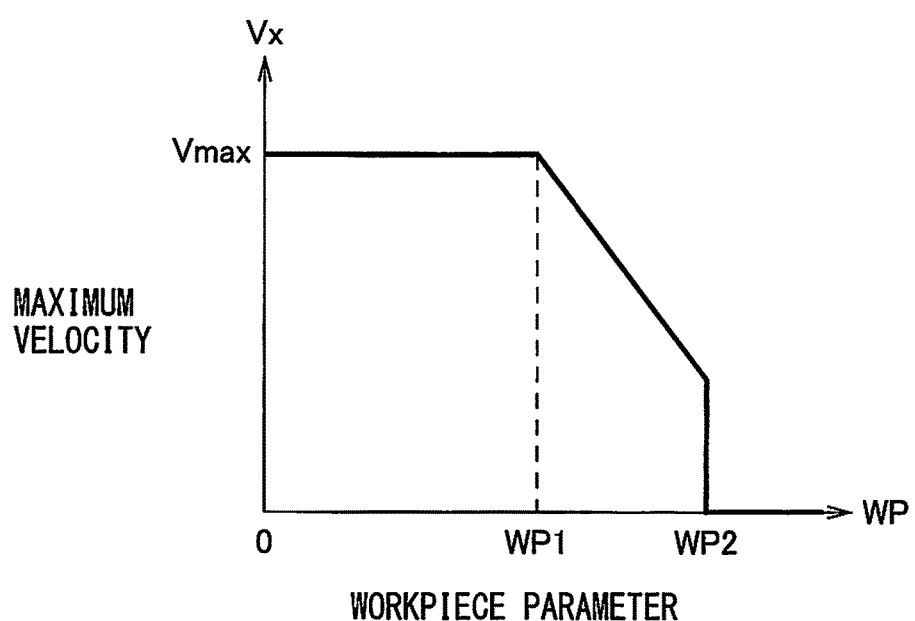
FIG. 3 is a diagram illustrating example of operating characteristics of a robot control apparatus according to an embodiment of the present invention.

When the mass m of a workpiece is equal to or less than m1, i.e., when the workpiece parameter WP is equal to or less than the rated workpiece parameter WP1 (the first range), the maximum velocity Vx is equal to the rated velocity Vmax as illustrated in FIG. 3 (Step S6).

When the mass m of a workpiece is greater than m1 and is equal to or less than m2, i.e., when the workpiece parameter WP is greater than the rated workpiece parameter WP1 and is equal to or less than the upper-limit workpiece parameter WP2 (the second range), the maximum velocity Vx is reduced to a value lower than the rated velocity Vmax (Step S7). Reducing the maximum velocity Vx as above prevents an increase in the kinetic energy E of a workpiece (the formula (I) above) due to an increased mass of the workpiece, thereby enabling a workpiece heavier than the workpiece maximum weight Wmax to be transferred without the need for using a larger robot. As illustrated in FIG. 3, the maximum velocity Vx is more reduced as the workpiece parameter WP becomes higher, and thus the maximum velocity Vx is set to an optimum value depending on the mass m of a workpiece, allowing for efficient transfer of workpieces.

When the mass m of a workpiece is greater than m2, i.e., when the workpiece parameter WP is greater than the upper-limit workpiece parameter WP2 (the third range), the maximum velocity Vx is 0 (Step S4). This prohibits the robot 1 from transferring a workpiece exceeding the transfer capability of the robot 1, thereby preventing damage to the robot 1, falling of a workpiece being transferred, and the like.

The present embodiment provides the following functional effects.

(1) The robot control apparatus 100 includes the setting unit 11 which sets a workpiece parameter WP, which is a parameter of a workpiece itself and affects transferability of the workpiece, the storage unit 12 which stores a rated workpiece parameter, which is a maximum parameter of the workpiece itself which can be transferred by the robot 1 at a rated velocity Vmax, and the velocity limiting unit 13 which reduces the maximum velocity Vx of the industrial robot 1 (the gripping unit) to a value lower than the rated velocity Vmax when the workpiece parameter WP set by the setting unit 11 exceeds the rated workpiece parameter WP1 stored in the storage unit 12. This allows the robot 1 with a simple configuration to transfer a workpiece heavier than the workpiece maximum weight Wmax which can be transferred at a rated velocity Vmax, and thus the robot control apparatus 100 can be structured at low cost.

(2) The maximum velocity is reduced by a larger amount as the workpiece parameter WP set by the setting unit 11 exceeds the rated workpiece parameter WP1 stored in the storage unit 12 by a larger amount. This allows the maximum velocity Vx of the robot 1 to be set to an optimum value depending on the mass m of a workpiece, and thus workpieces can be transferred efficiently.

(3) The storage unit 12 further stores an upper-limit workpiece parameter WP2, which is an upper-limit parameter of the workpiece itself which can be transferred by the robot 1 and is greater than the rated workpiece parameter WP1, and the velocity limiting unit 13 will stop operations of the robot 1 when the workpiece parameter WP which has been set by the setting unit 11 is greater than the upper-limit workpiece parameter WP2. This prohibits the robot 1 from transferring a workpiece exceeding the transfer capability of the robot 1, thereby preventing damage to the robot 1, falling of a workpiece being transferred, and the like.

(4) When the workpiece parameter WP is defined by the mass m and inertia I of a workpiece, the velocity limiting unit 13 calculates a first maximum velocity Vx1 with respect to the mass m and a second maximum velocity Vx2 with respect to the inertia I respectively (the formulas (II) and (III) above) and sets the maximum velocity Vx to a value smaller of the two. In this way, taking into consideration a plurality of physical quantities, i.e., the mass m and inertia I, as constituents of a workpiece parameter WP makes it possible to comprehensively evaluate transferability of a workpiece at a rated velocity Vmax and appropriately define a maximum velocity Vx of the workpiece gripping unit of the robot 1.

It should be noted that, although the above embodiment assumes that the setting unit 11 sets the mass m, inertia I, and the like of a workpiece as a workpiece parameter PR, any other physical quantity may be set as a workpiece parameter PR in so far as it represents a parameter affecting transferability of a workpiece itself to be transferred by the robot 1. Although the above embodiment assumes that the maximum velocity Vx is reduced by a larger amount as the workpiece parameter WP set by the setting unit 11 exceeds the rated workpiece parameter WP1 stored in the storage unit 12 by a larger amount (refer to FIG. 3), the velocity limiting unit 13 may be configured in any manner in so far as the maximum velocity Vx is reduced to a value lower than the rated velocity Vmax when the specified workpiece parameter WP is greater than the rated workpiece parameter WP1. It should be noted that the present invention may be applied to a robot for transferring various workpieces and that workpieces include not only various parts for assembly or machining but also tools and the like.

According to the present invention, the maximum velocity of an industrial robot is reduced to a value lower than the rated velocity when the workpiece parameter is greater than the rated workpiece parameter, thereby enabling the industrial robot to transfer a heavy object with a simple configuration without the need for adding a balancer or the like.

The above descriptions are provided by way of example only, and the present invention is not limited to the above-described embodiment and its example variations as far as features of the present invention are not compromised. Constituents of the above embodiment and example variations include those that are possibly or obviously replaced while maintaining the unity of the invention. In other words, any other possible embodiment within the scope of technical ideas of the present invention also falls within the scope of the present invention. In addition, the above embodiment may be arbitrarily combined with one or more of example variations.

The invention claimed is:

1. A robot control apparatus, comprising:
a processor configured to set a workpiece parameter value of a parameter of a workpiece, wherein the parameter affects transferability of the workpiece to be held and transferred by an arm of an industrial robot; and
a memory configured to store
a rated workpiece parameter value, which is a maximum value of the parameter at which the workpiece is transferable by the industrial robot at a rated velocity of the industrial robot; and
an upper-limit workpiece parameter value, which is an upper-limit value of the parameter of the workpiece transferrable by the arm of the industrial robot, and is greater than the rated workpiece parameter value,
wherein
the parameter of the workpiece includes a first parameter of the workpiece and a second parameter of the workpiece, the second parameter being different from the first parameter of the workpiece, and
the processor is configured to, in response to the set workpiece parameter value being greater than the stored rated workpiece parameter value and not greater than the upper-limit workpiece parameter value, for the first and second parameters, calculate a reduced maximum velocity of the industrial robot by
calculating a first maximum velocity with respect to the first parameter and a second maximum velocity with respect to the second parameter,
determining which one of the first and second maximum velocities has a smaller value,
setting the smaller value as the reduced maximum velocity of the industrial robot, the reduced maximum velocity being lower than the rated velocity, and
causing the industrial robot to transfer the workpiece at the reduced maximum velocity.

2. The robot control apparatus according to claim 1, wherein
the processor is configured to calculate the reduced maximum velocity of the industrial robot that is the value lower than the rated velocity by a larger amount as the workpiece parameter value set by the processor exceeds the rated workpiece parameter value stored in the memory by a larger amount.

3. The robot control apparatus according to claim 1, wherein the processor is configured to limit acceleration and deceleration of the industrial robot when the workpiece parameter value set by the processor is greater than the rated workpiece parameter value stored in the memory.

4. The robot control apparatus according to claim 1, wherein the first parameter of the workpiece includes a mass of the workpiece, and the second parameter of the workpiece includes an inertia of the workpiece.

5. The robot control apparatus according to claim 1, wherein
the processor is configured to stop operation of the industrial robot when the workpiece parameter value set by the processor is greater than the upper-limit workpiece parameter value stored in the memory.

6. The robot control apparatus according to claim 1, wherein
in response to the set workpiece parameter value being greater than the stored rated workpiece parameter value and less than the upper-limit workpiece parameter value, the processor is configured to calculate the reduced maximum velocity of the industrial robot.

7. The robot control apparatus according to claim 1, wherein the set workpiece parameter value includes a first set workpiece parameter value for the first parameter and a second set workpiece parameter value for the second parameter.

* * * * *